United States Patent [19]
Luebbert

[11] Patent Number: 5,530,794
[45] Date of Patent: Jun. 25, 1996

[54] METHOD AND SYSTEM FOR HANDLING TEXT THAT INCLUDES PARAGRAPH DELIMITERS OF DIFFERING FORMATS

[75] Inventor: David L. Luebbert, Bellevue, Wash.

[73] Assignee: Microsoft Corporation, Redmond, Wash.

[21] Appl. No.: 298,210

[22] Filed: Aug. 29, 1994

[51] Int. Cl.⁶ ................................................. G06F 17/24
[52] U.S. Cl. ........................................ 395/148; 395/146
[58] Field of Search .................................. 395/144, 145, 395/146, 148, 147, 149; 364/419.1, 419.14, 419.17, 419.19

[56] References Cited

U.S. PATENT DOCUMENTS

| | | | |
|---|---|---|---|
| 4,503,516 | 3/1985 | Agnew et al. | 395/500 |
| 4,587,631 | 5/1986 | Nielsen et al. | 395/146 |
| 4,625,295 | 11/1986 | Skinner | 395/800 |
| 4,687,353 | 8/1987 | DeGeorge et al. | 400/76 |
| 5,167,016 | 11/1992 | Bagley et al. | 395/144 |

*Primary Examiner*—Heather R. Herndon
*Assistant Examiner*—Joseph R. Burwell
*Attorney, Agent, or Firm*—Ronald M. Anderson

[57] ABSTRACT

A method and word processing system for handling text pasted into a document that uses a paragraph delimiter different than that employed by the word processing system. A computer system (10) that is generally conventional in design executes a word processing program that efficiently handles text pasted into a word processing document, even though that text uses a paragraph delimiter different than the native paragraph delimiter of the word processing system. The document opened by the word processing system has a corresponding piece table that includes an array of character positions and an array of data records. Each piece of the piece table represents adjacent characters that stored together in a file, and each record or PCD in the array of data records corresponds to a different piece in the piece table. When a file is opened to select text that will be pasted into the word processing document, a corresponding entry is made in the piece table that includes pointers to a file control block (FCB) for the opened file. The FCB indicates the type of paragraph delimiter used for that text. Thus, the word processing system tracks the appropriate paragraph delimiter used and translates any foreign paragraph delimiter to the native delimiter when displaying the text for editing. When the document is saved to a file, the paragraph delimiter associated with the text is translated to the native paragraph delimiter used by the word processing system.

29 Claims, 5 Drawing Sheets

METHOD AND SYSTEM FOR HANDLING TEXT THAT INCLUDES PARAGRAPH DELIMITERS OF DIFFERING FORMATS

FIELD OF THE INVENTION

The present invention generally pertains to a method and a system for word processing text prepared under different processing or operating systems, and more specifically, to a method and a word processing system for handling text that includes paragraph delimiters of differing formats.

BACKGROUND OF THE INVENTION

It has become relatively commonplace to exchange documents created on different computer systems and to paste text from such documents into a new word processing document that is being created. In this discussion, the term "imported" is used in connection with a document or file created on a word processing system or operating system that is different than a "native" operating system or word processing system. The conventional approach for importing text produced on a different computer system or by a different word processing program is to first translate the entire text file into the native word processing system format and then to store the converted text in another file. After the translation and conversion operation is completed, the newly created file is opened so that the text can be displayed for review and editing by the user and for pasting into another document. However, if the size of the text being translated into the native format is relatively large, e.g., greater than 100 Kbytes, several minutes may be required to complete the translation process. During the time that the translation process and storage of the translated text occurs, the user is forced to idly wait, since the word processing system is unable to handle any other task.

One type of translation that is often required when text is pasted into a document from another system is the translation between paragraph delimiters. Three types of paragraph delimiters are commonly used on computers. One of the more common paragraph delimiters is used in MS-DOS and in MICROSOFT™ Word for Windows prior to Version 6; it is a two-byte sequence of characters, in which the first byte corresponds to a carriage return (CR) and the second byte to a line feed (LF), i.e., the two-byte sequence "13 10." Word processing systems running under various versions of the UNIX™ operating system use a single byte "10" as a paragraph delimiter, while the APPLE™ operating system and MICROSOFT™ Word for Windows Version 6 use a single byte "13" for this purpose. The delay that is typically incurred in translating paragraph delimiters of documents imported from a foreign word processing system into a native paragraph delimiter format arises because every character of the imported text must be scanned in sequence into memory. Any foreign format paragraph delimiters encountered are converted into the native paragraph delimiter before the text is written into another file.

If foreign paragraph delimiters are not converted before the text is displayed to the user, unexpected results can occur. For example, if an MS-DOS or WINDOWS™ computer reads and displays a text file created using the paragraph delimiter without translating the paragraph delimiters, the imported text file will appear as one long paragraph, even though it may have originally included many paragraphs. If a MACINTOSH™ computer program read and displays a text file created using the paragraph delimiter employed by MS-DOS or WINDOWS, without translating the paragraph delimiters, the screen will display an unrecognizable character for each of the LF characters of the two-byte sequence used as a delimiter. Similarly, a UNIX™ word processing program importing the same text will display an unrecognizable character for each of the CR characters of the two-byte sequence used as a delimiter.

Properly identifying the end of each paragraph is important in most word processing systems because much of the formatting is related to text grouped by paragraphs. The default font for characters of text, the margins applied to the text, and the type of justification (right, left, or centered) are dependent upon accurately denoting the end of paragraph for each block of text in a document. In connection with this requirement, any word processing program that uses (or translates) the two-byte sequence CRLF must avoid splitting the sequence by putting an insertion point for text between the CR and the LF bytes of the paragraph delimiter sequence. Once the two-byte sequence is broken by insertion of even a single character of text, the paragraph end denoted by the sequence can no longer be recognized.

Preferably, a word processing program should be able to handle foreign paragraph delimiters without first requiring that the imported text in which such delimiters are used first be translated and stored as a converted file. To avoid inserting text into the two-byte sequence CRLF, the word processor should be able to keep track of the length of the delimiter and insure that the insertion point is always on one side or the other of the delimiter sequence. Further, if the user only wants to view a document or to edit it without saving the text, the word processing system should not need to translate the foreign delimiters to the native delimiter format. Only when a document that includes text using the foreign paragraph delimiters is saved to a file should it be necessary to translate between paragraph delimiter types. None of the prior art word processing systems have these capabilities or operate in this manner. By making these features available on a word processing system, it should be possible for users who frequently import text prepared on foreign word processing systems to save considerable time.

SUMMARY OF THE INVENTION

In accordance with the present invention, a method is defined for properly displaying text that uses a foreign paragraph delimiter, the foreign paragraph delimiter being different than a native paragraph delimiter used for text in documents created on a word processing system. This method includes the step of producing a character position array in which each character of a document that is open on the word processing system is assigned a coordinate position. The character position array is divided into a plurality of pieces. Each piece comprises a string of characters that are stored adjacent to one another in a file. In addition, an array of data records is produced that includes entries corresponding to each piece of the character position array. Each entry includes a file number and a file position within a file at which the string of characters comprising the piece are stored. A file control block (FCB) for each file storing the text used in the document is produced when the file is initially opened by the word processing system. Delimiter identification data are recorded in the FCB of each file. The delimiter identification data indicate a type of paragraph delimiter used by the text stored in the file. Each time that a character of the document that was read from a file is displayed, the word processing system refers to the character position array and to the array of data records to determine a specific file in which the character is stored. The delimiter identification data in the FCB for the specific file indicate the type of paragraph delimiter that is used for a paragraph containing the character. If the paragraph containing the character uses a foreign paragraph delimiter, the foreign paragraph delimiter is translated to the native paragraph delimiter in a display buffer, so that the paragraph containing the character is properly displayed to the user. All foreign paragraph delimiters used for text in the document are translated to the native paragraph delimiters when the document is saved to a file.

The method also comprises the step of checking for a header or a trailer to the text in a file opened by the word processing system. The header or trailer at times indicates the type of paragraph delimiter used by the text so that corresponding delimiter identification data are provided in the FCB for that file. For a text file that does not include a header or trailer that indicates the type of paragraph delimiter used, at least a portion of the text in the text file is scanned when the text file is opened by the word processing system, to identify a specific type of paragraph delimiter that is used. The delimiter identification data corresponding to the specific type of paragraph delimiter are then specified in the FCB for the text file. To determine the type of paragraph delimiter used in the text file, any occurrences of each type of the paragraph delimiters are counted to identify the type of paragraph delimiter that occurs most often. The type of paragraph delimiter that occurs most often thus determines the delimiter identification data specified for the FCB of the text file.

For another type of file, the method includes the step of maintaining a table of limit file positions within each file. The limit file position reports a position within the file for each paragraph delimiter used within the text so that the paragraph delimiter used at that position can be identified.

The method further comprises the steps of determining a beginning paragraph file position for a paragraph in which a specific character of text is found, determining a limit character position of the paragraph, and reporting the size and type of the paragraph delimiter found at the end of the paragraph. In this way, the delimiter identification data that are inserted into the FCB for the file are determined.

Another step of the method is using the delimiter identification data to identify any two-byte paragraph delimiter sequence that is used in the text. When editing the document, the word processing system precludes an insertion point from being selected between the two-bytes comprising the two-byte paragraph delimiter sequence.

Preferably, the method includes the step of displaying a special character that indicates an end of the paragraph for any of the plurality of different types of paragraph delimiters used for the text being displayed; foreign paragraph delimiter characters are not displayed.

Still further steps of the method include translating any foreign paragraph delimiters to the native paragraph delimiter in the document when the document is saved, and producing a new character position array that includes pieces that do not use any foreign paragraph delimiters. A new array of data records including entries that correspond to each piece of the new character position array is then produced. Each entry has a file number for the file in which the document is saved and a file position within that file. After the document is saved, any calls by the word processing system to retrieve text for display and editing are directed to the file in which the document was saved instead of to the files in which the pasted text was originally stored. If the step of saving the document is interrupted before it completes, the character position array and the array of data records originally produced are again referenced to ensure that all of the character positions in the document are restored to their original values, including any references to the foreign paragraph delimiters used for the text.

An additional aspect of the present invention is a word processing system in which paragraphs of text that use a foreign paragraph delimiter are properly displayed, the foreign paragraph delimiter being different than a native paragraph delimiter of documents created on the word processing system. The elements of the word processing system carry out functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Overview of Invention

Figure 1:
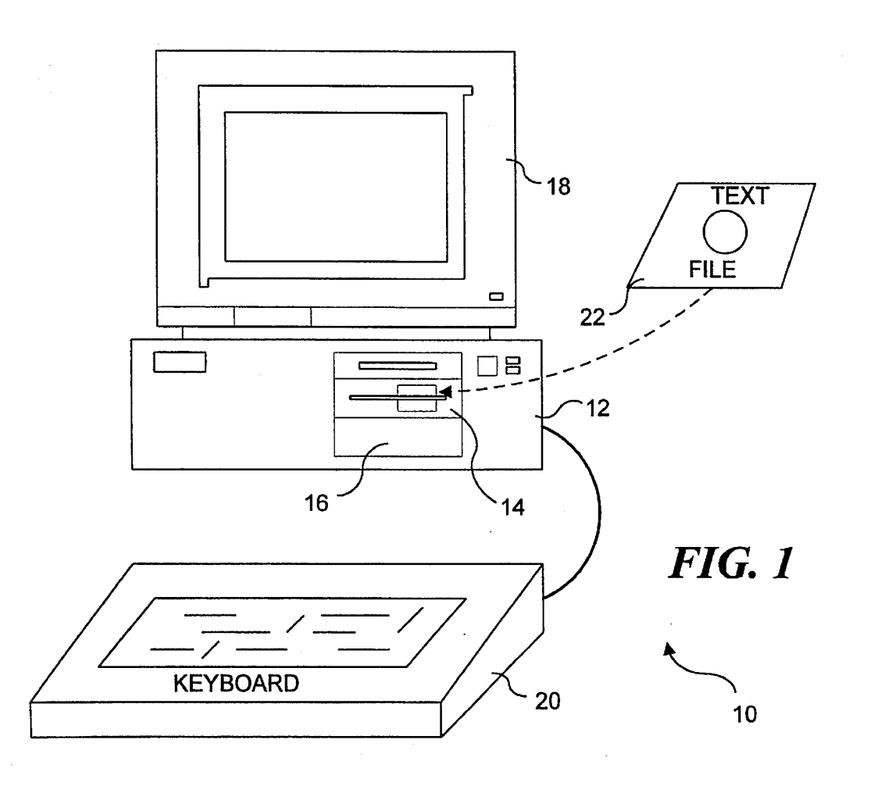
FIG. 1 is a schematic block diagram of a conventional personal computer suitable for implementing software instructions to carry out the present invention, as indicated by the imported text file stored on a floppy disc for pasting into a document.

With reference to FIG. 1, a personal computer system of a type suitable for implementing the present invention as a work processing system is generally illustrated at a reference number 10 in FIG. 1. Personal computer system 10 includes a conventional desktop console 12 in which is disposed a central processing unit (CPU), random access memory (RAM), read only memory (ROM), and other supporting circuitry and integrated circuits, none of which is shown separately, because they are well known to those of ordinary skill in the art. In addition, console 12 includes a floppy disk drive 14 and a hard drive 16. A display screen 18 is coupled to console 12, as is a keyboard 20 (and any other user interface device, such as a mouse—which is not shown). The CPU within console 12 is preferably an INTEL™ type 80386, 80486, or PENTIUM™ processor, or any equivalent or alternative CPU that is suitable for running a graphics user interface, such as WINDOWS™ 3.1, which is produced by the assignee of the present invention. It is also contemplated that the present invention embodied in word processing software can be executed on a portable (or laptop) computer or on a workstation that is coupled to a network (neither shown), and that it can be implemented on other types of computers and CPUs, such as those marketed by APPLE™.

The present invention is embodied within word processing software, the preferred embodiment comprising the program MICROSOFT™ Word for Windows, Version 6, which is written to run under the WINDOWS™ operating system and under other operating systems designed to run WINDOWS™ software. However, the present invention can also run in other word processing systems, and under different operating systems, such as the APPLE™ MACINTOSH™ System 7. It can also be embodied in word processing systems operating in non-graphic user interface environments, such as under MS-DOS or UNIX™.

Figure 2:
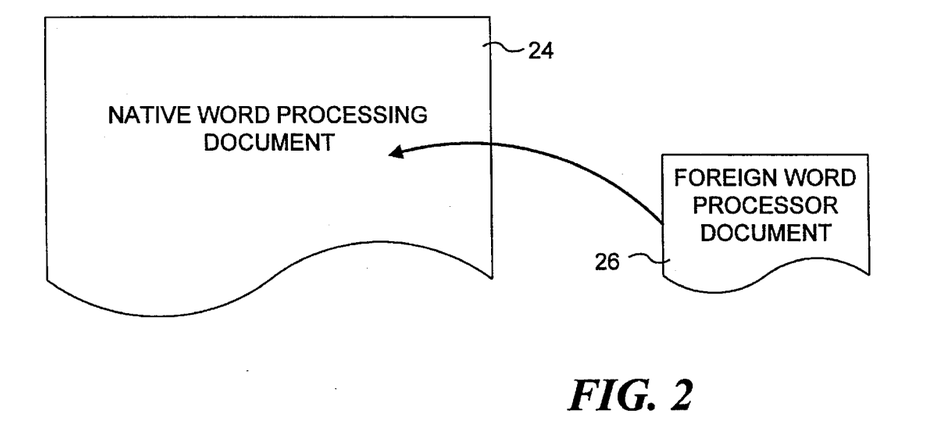
FIG. 2 is a block diagram that shows the pasting of a foreign word processor document (that uses a foreign paragraph delimiter) into a native word processing document.

As illustrated in FIG. 1, a text file stored on a floppy disk 22 or on hard drive 16 is provided as a source of text that will be inserted into a native word processing document 24, which is produced by the word processing system being executed on personal computer system 10. The text file may be ASCII, i.e., without any headers or footers of the type commonly used in connection with word processing documents. Alternatively, as indicated in FIG. 2, a foreign word processor document 26 may serve as the source of the text to be pasted into native word processing document 24. The text that is pasted into the native word processing document may use the same type of paragraph delimiter as the native word processing document or a different type of paragraph delimiter. In Word for Windows Version 6 (hereinafter referred to simply as "WinWord 6"), a paragraph delimiter 13 is used, which is identical to the paragraph delimiter used in the APPLE™ operating system. However, other word processing programs, MICROSOFT™ Word for MS-DOS and earlier versions of Word For Windows, text files created under MS-DOS, and other word processing systems running under the various forms of the UNIX™ operating system typically use one of the other two types of paragraph delimiters, i.e., the two-byte delimiter 13 10 or the single byte paragraph delimiter 10.

When foreign text, i.e., text created by a different word processing program or under an operating system, is pasted into native word processing document 24 open on WinWord 6, the foreign document can be opened immediately without the need for scanning all of the text in the document to translate any foreign paragraph delimiter that is used into the native paragraph delimiter. Further, text using a foreign paragraph delimiter can be immediately displayed on display screen 18 and edited without the need to translate the entire file from which the text is drawn. Only when native word processing document 24 is saved to a file will all foreign paragraph delimiters of any pasted text be translated into the native paragraph delimiters in the file.

Using the method of the present invention, text drawn from files employing entirely different paragraph delimiters can thus be inserted into native word processing document 24 in a manner that is substantially transparent to the user. In addition, the present invention handles two-byte paragraph delimiters so as to ensure that text is not inserted between the two bytes comprising the paragraph delimiter sequence; this error is sometimes encountered in word processing systems in which the two-byte paragraph delimiter sequence is used as the native paragraph delimiter.

Description of Piece Table Data Structure

One of the key aspects of the present method is its use of a data structure that allows the word processing system to recognize the type of paragraph delimiter that is used in a file in which text pasted into a document was originally stored. The data structure that enables this function is referred to as a "piece table." In the piece table, each character in a document is assigned a numerical coordinate, ranging from the first character at coordinate zero to the $n_{th}$ or last character, which is assigned coordinate n–1. Thus, a piece table includes a monotonically increasing sequence of character position coordinates, with duplicates not allowed, which are stored in a variable length array. The first entry in the character position array is 0, the coordinate of the first character of the text that appears at the beginning of a document, and the last coordinate position in the character position array contains the coordinate n for the limit character of a document that contains n characters. The character position array partitions the document into a sequence of pieces. Each piece represents a string of characters that are adjacent to each other and have common formatting characteristics.

Although it would be hard to conceive of such a document, in the worst possible scenario, each character in a document could have been pasted into the document so that no adjacent characters in the document are located at adjacent file locations in the files that have been opened by the word processing system. In this case, n+1 entries describing n pieces would be required in the piece table for the document. This condition could occur if the user inserted a new character between each character that was originally recorded in a newly opened word processing document. It should be apparent that most documents require far fewer pieces than this extreme case, since typically, users do not insert new characters at every available position within a document.

The piece table also includes an array of data records, which are kept in one-to-one correspondence with the entries recorded in the array of document character positions. Each of these entries is referred to as a piece descriptor (PCD). Each record or entry comprising a PCD in the array of data records includes a file number identifying a particular file and a file position within that file where the characters in the corresponding piece can be found. Thus, if any word processing document that is stored in a file on hard drive 16 is opened by the word processing system, the corresponding PCDs for the pieces in the array of character positions record the file number for that file and a file position within the file where the text referenced by the pieces can be found. Similarly, a file that is opened to enable text to be pasted into the native word processing document introduces a second file identifier within the PCDs of the array of data records that identifies the file where each piece of text pasted into native word processing document 24 is stored. Each such reference also indicates the file position within the open file at which the piece of text can be found. For example, if two adjacent characters in the document are at coordinate positions 100 and 103 in the array of character positions, and the corresponding PCD for the character at coordinate 100 points to file 2, location 1010, the character in the document at coordinate 100 can be found at location 1010 in file 2, and the character at coordinate 101 in the array of character positions can be found at location 1011 in file 2. Similarly, any character position coordinate in the piece table can be found by referencing the corresponding PCD for the piece in which the character is disposed to determine the file number and file coordinate. Further details of this process are discussed below.

It is important to distinguish between "document" and "file" in this discussion. For purposes of this disclosure and the claims that follow, a document is simply a sequence of characters that is being created or edited using the word processing system and may include text pasted from one or more files. The piece table enables the word processing system to keep track of both the file(s) from which each character of text in the document open on the word processing system is pasted and the file position within each such file. With this information, the paragraph delimiters that are used by text pasted into the document are readily determined.

Each time that a file is opened by the word processing system for pasting text into a document, information concerning the file is stored in a record referred to as an FCB. Although much other data are stored in the FCB, for purposes of the present invention, it is important to note that WinWord 6 stores two single bit fields in the FCB that identify the type of paragraph delimiter used by the text stored within the file referenced by the FCB. The first bit field is called the "f13 Term." This term is set to a binary 1 or true when the paragraph delimiter used by text stored in the file ends in 13. Thus, this bit is set to true when the file was created on a MACINTOSH™ computer or under WinWord 6. The bit field is set to zero or false when the file to which it relates was created under the UNIX™ operating system or by MS-DOS, since the single byte 10 and the two-byte sequence 13 10, which are respectively used as paragraph delimiters in those instances, do not end with the character 13. Similarly, the second bit field, which is entitled fCrLf, is set to a binary 1 or true whenever the paragraph delimiter sequence 10 13 is used for the text in a file.

The following Table 1 shows how these two bit field terms are able to uniquely identify the three paragraph delimiters.

TABLE 1

| System (Para Delimiter) | f13Term Bit Field | fcrLf Bit Field |
|---|---|---|
| MS-DOS/Pre-WinWord 6 (13 10) | False | True |
| MACINTOSH™/ WinWord 6 (13) | True | False |
| UNIX ™ (10) | False | False |

To enable identification of the appropriate FCB that should be checked by the word processing system in order to determine the paragraph delimiter that is used with a specific piece of text, each PCD in the array of data records includes a small integer that is an index into an array of pointers associated with the FCBs. The index for the FCBs stored in PCDs thus links each PCD to the relevant FCB for the file in which a piece of the document was originally stored. This link to the FCB provides the information for the word processing system needed to identify the particular paragraph delimiter that is used for specific text.

Steps of the Method for Handling Paragraph Delimiters

Figure 3:
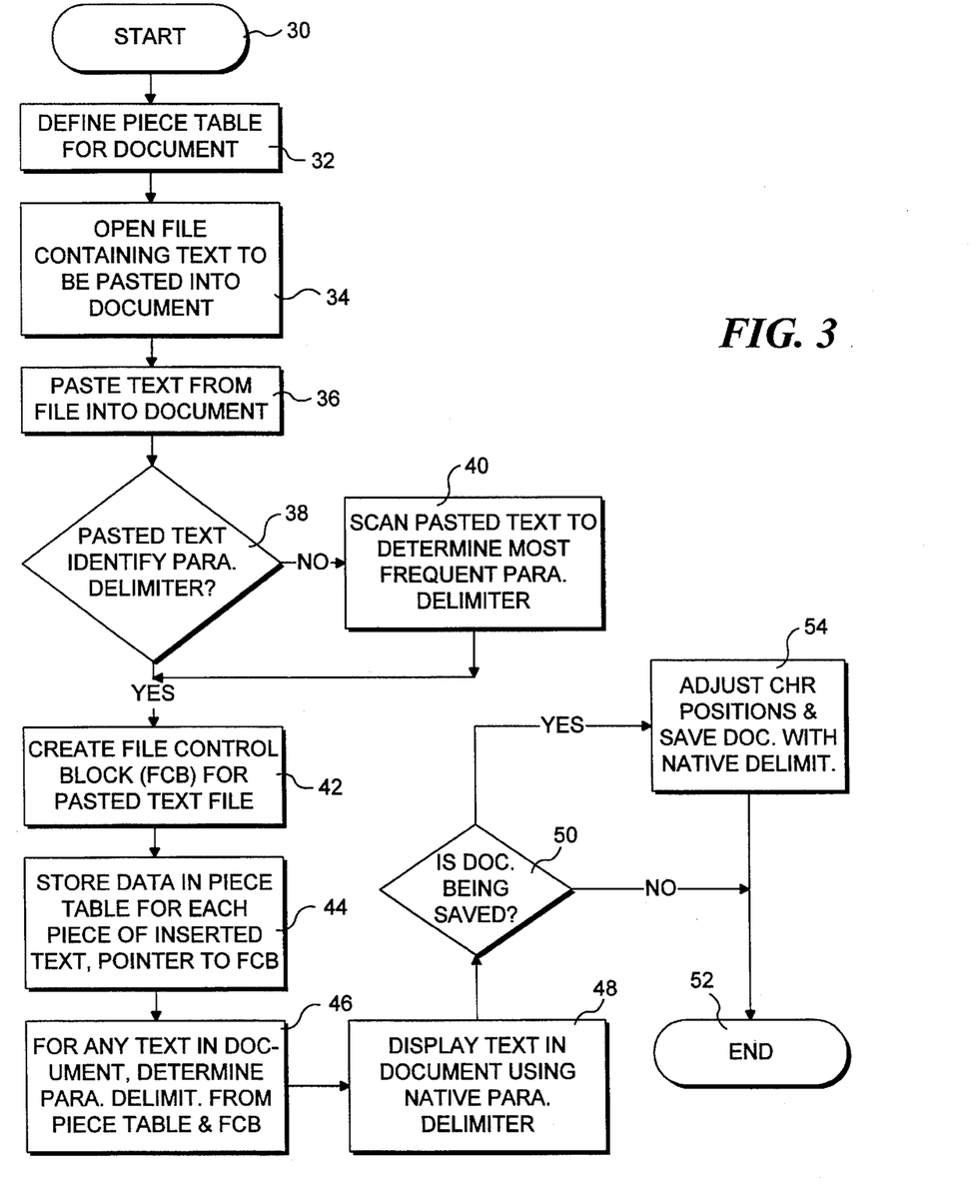
FIG. 3 is a flow chart illustrating the logical steps implemented in carrying out the present invention.

The logical steps involved in handling text pasted into a document in accordance with the present invention are illustrated in a flow chart in FIG. 3. The method begins at a start block 30 and proceeds to a block 32 in which the word processing software defines a piece table for native word processing document 24 when a document is opened by the word processing system. It should be recognized that there are four possible states for a piece table when a document is opened. In the first case, for any document that was previously fast saved to a file, a piece table will exist in that file. The piece table is needed in this case because the text comprising the document was likely not stored in a contiguous sequence in the file. By reference to the piece table, the word processing system will know how the pieces of text in the file knit together to form a coherent document. The second case applies to a full saved word processing document. For a document that was previously full saved, no piece table need be stored in the document file because the header information of the file is sufficient to describe the document, and all of the text in the document is in a natural contiguous order. The word processing system will create a one entry piece table encompassing all text stored in the file when the file is first opened. The third case applies to a document that is a text file and not in the native format of the word processing system. In this case, a piece table is created when the file is opened that points to the first character of the file and ends at the last character. The fourth case applies when a new document is initially created. At that time, the word processing system produces an "empty" piece table consisting of a single piece.

Figure 4:
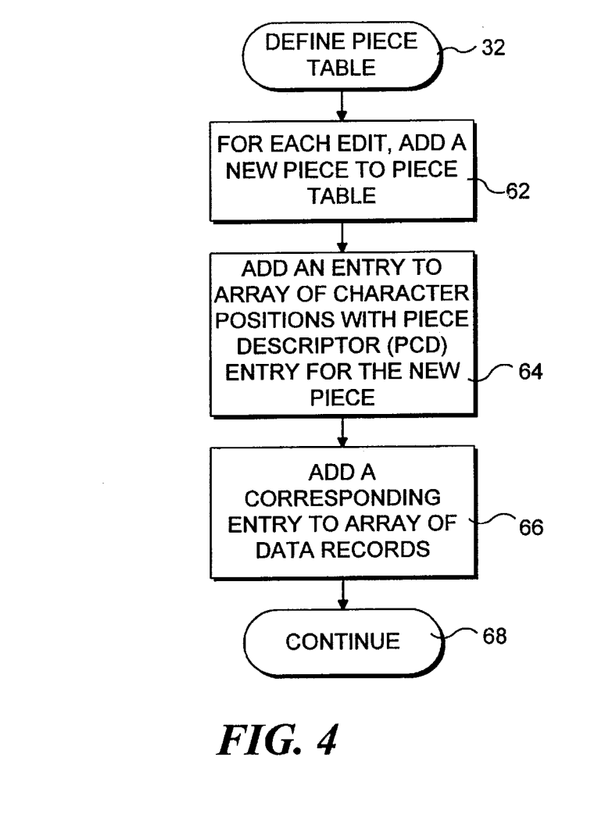
FIG. 4 is a flow chart that shows in greater detail the steps involved in producing a piece table.

With reference to FIG. 4, further details are shown relating to the use of the piece table for tracking editing changes/additions to the document. In a block 62, the logic ensures that for each change to the document, whether relating to a modification of existing text or addition of new text, a corresponding new piece is added to the piece table for the document. For example, if the user inserts a word in the document, a corresponding piece indicating the character position of the new word is added to the piece table. A block 64 indicates further details concerning the addition of a piece to the piece table. According to this step, an entry for each new piece is made to the array of character positions to provide a reference to the character position of the editing change within the document. Further, a piece descriptor (PCD) recording a file number identifying a particular file and a file position within that file at which the characters comprising the text for the new piece is determined, and in a block 66, is added as a corresponding entry in the array of data records. (Although the steps discussed up to this point have not provided for pasting text, it should be noted that if the edit to the document is pasting text from another file, the PCD will point to the file number for that file from which the text was pasted and to a file position within that file. The next paragraph discusses this aspect of invention in greater detail.) As indicated by a block 68, the process continues—at least until no further editing of the document is desired.

Figure 5:
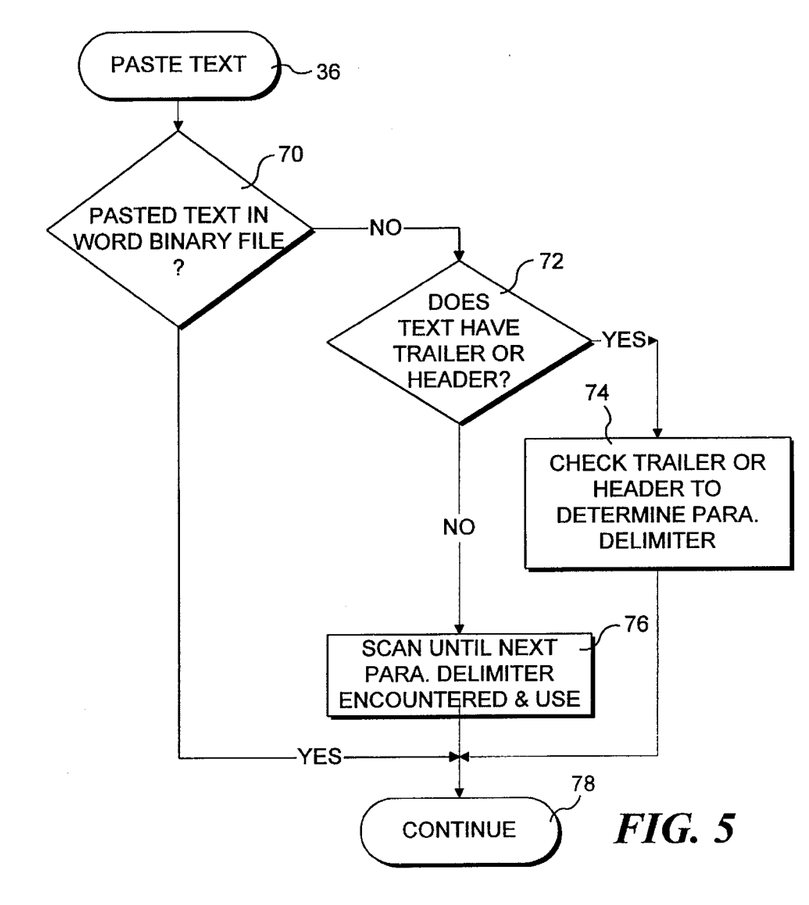
FIG. 5 is a flow chart illustrating the details implemented in pasting text into a document.

At a block 34 in FIG. 3, based upon a request by the user, the word processing system opens the file containing the text to be pasted into native document 24. This file may be stored on hard drive 16 or may be stored on floppy disk 22. Once the imported text file is opened, the user is given the opportunity to select the text from the file that is to be pasted into the document. In a graphic user environment, this selection can be accomplished using a pointing device, such as a mouse (not shown) or by using keys on keyboard 20 to select all or portions of the text stored in the file for pasting into the document. Next, a decision block 38 determines if the imported text includes data that specifically identify the type of paragraph delimiter used within the file from which the text is drawn. Details of block 36 and of decision block 38 are illustrated in FIG. 5. Referring to FIG. 5, a decision block 70 determines if the imported text has been drawn from a MICROSOFT™ word processing system binary file.

This determination is particularly relevant because any of the MICROSOFT™ word processing programs that have been marketed produce binary files when they save a document. These word processing binary files include headers that identify the type of paragraph delimiter used for text stored in the file. Other word processing programs from other software companies also store a header or trailer record at the beginning or end of a document file that include a field identifying the kind of paragraph delimiter used in the file for the document.

In binary files produced by MICROSOFT™ word processing programs, the header that is provided is referred to as a file information block (FIB). In the FIB is stored an identifier field entitled "wIdent" (fib.wIdent) that identifies the type of paragraph delimiter used. By checking the fib.wIdent field, the word processing system can readily determine the correct settings for the f13Term and fCrLf file bits that should be stored in the FCB for the binary file that is being opened.

If the pasted text is not from a Word binary file, the logic proceeds to a decision block 72, which determines if the text is pasted from a file produced by a different word processing system or other source that also uses a trailer or header in which the type of paragraph delimiter used in the file is identified. Assuming that the imported text file meets this criterion, a block 74 checks the trailer (or header) to determine the paragraph delimiter that is used in the file.

Word processing programs also can paste text from a file that has no trailer or header, such as a plain ASCII text file like that produced using either MS-DOS or a line editor program. In this case, a different technique must be used to determine the paragraph delimiter that is used with the text contained within the file. As indicated in a block 76, the word processing system scans the text in the imported text file looking for one of the three types of paragraph delimiters, i.e., a 13, a 10, or the two-byte sequence 13 10. This scanning operation heuristically determines the appropriate paragraph delimiter that should be used for the text pasted from the text file.

Figures 6, 7:
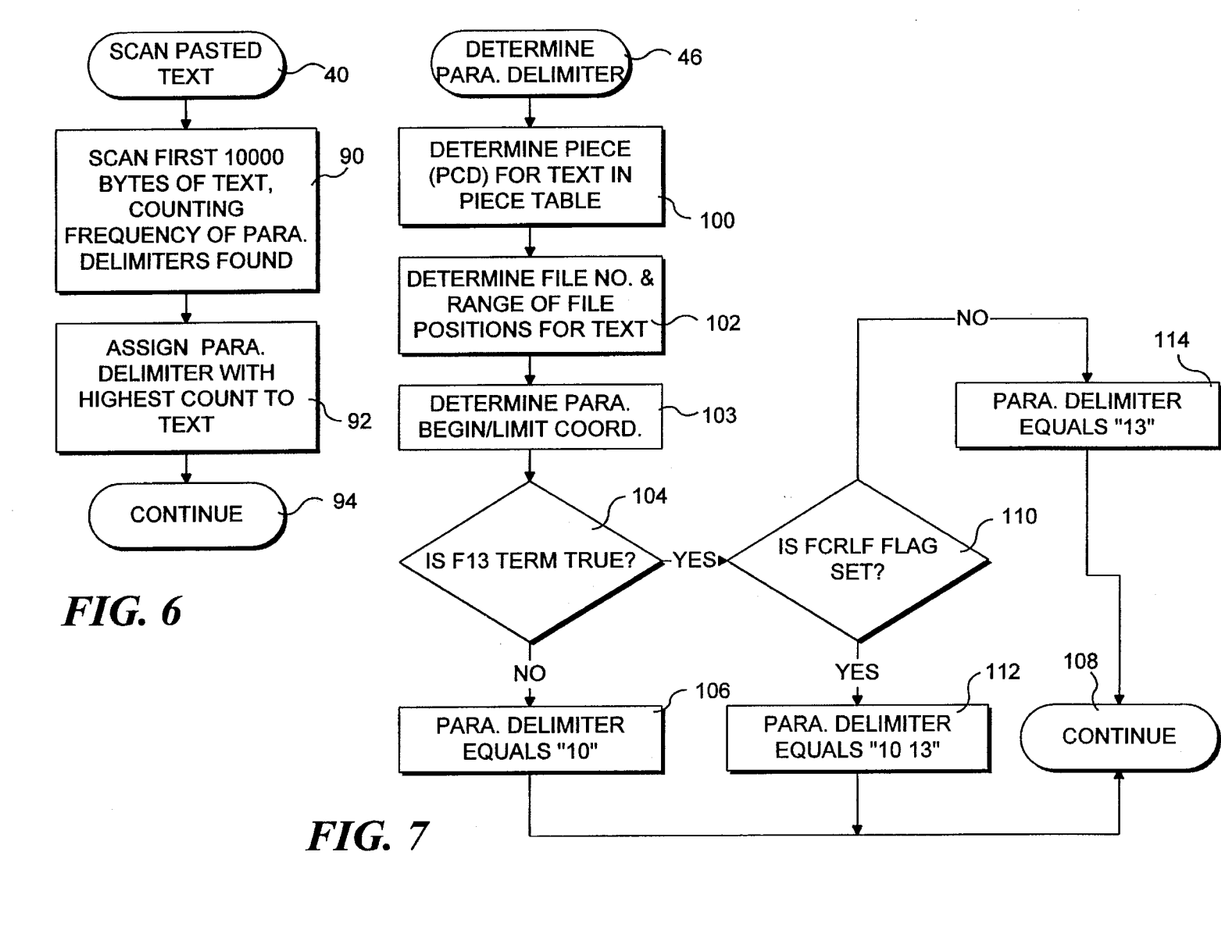
FIG. 6 is a flow chart showing the steps required for scanning pasted text that does not include a header or trailer indicating the type of paragraph delimiter used in the text.
FIG. 7 is a flow chart illustrating the logical steps for determining the paragraph delimiter used in text that is pasted into a document, by reference to the piece table and FCB for that text.

Details of the scanning operation are shown in FIG. 6. Referring to FIG. 6, a block 90 indicates that the word processing system scans the first 10,000 bytes of text (or less if the file contains fewer characters). During this scan, it counts each occurrence of the different types of paragraph delimiters found. In many instances, only a single type of paragraph delimiter will be found in the text being pasted. However, it is possible that the pasted text may include multiple instances of the different characters used for the different types of paragraph delimiters, some of which will not be used as a paragraph delimiter. By counting the instances of each type of paragraph delimiter found, the word processing system determines the paragraph delimiter having the highest frequency of occurrences, and as indicated in a block 92, assigns the paragraph delimiter with the highest frequency count to all text within the file that is being pasted into the native word processing document. The type of paragraph delimiter that occurs most often in the text has the highest probability of being the one that is used in the file. The process continues as indicated in a block 94, leading the logic to return to FIG. 5.

As shown in FIG. 5, after the scanning operation is completed, the logic continues at a block 78, transferring back to the steps of the flow chart in FIG. 3. However, before returning to FIG. 3, further steps in FIG. 5 should be considered. Specifically, if the response to decision block 70 indicates that the pasted text was saved in a Word binary file, the FIB for that file indicates the appropriate paragraph delimiter that should be used.

As already noted, text pasted into a word processing document may have been stored in a file that does not identify the type of paragraph delimiter used. Accordingly, decision block 38 determines if the pasted text identifies the paragraph delimiter that is in use by the text pasted into the document. If not, the word processing system cannot rely upon a paragraph file position table to locate paragraph delimiters in the piece, but instead, must rely upon the heuristic scanning method discussed above. After identifying the paragraph delimiter used by the pasted text, the word processing system proceeds to a block 42 in which it creates an FCB for the imported text file in which the paragraph delimiter used by the file is indicated by the two bit fields. In this manner, for each piece of inserted text that is referenced by a separate piece within the piece table, the word processing system stores data that include a pointer to the FCB for the file in which the text of the piece is originally stored. The two single bit fields within the FCB can thereafter be used to determine the appropriate paragraph delimiter that is used for text referenced by a piece in the piece table for the document. A block 44 shows the step for storing the data in the piece table for each piece of inserted text. The following discussion explains how this information that is stored in the FCBs is referenced and used to identify the type of paragraph delimiter used for the paragraph in which is disposed any character of the document (native or imported) that is displayed on the display screen.

Determining Paragraph Delimiter Used Within a Piece of Text of a Document

In a block 46, the word processing system determines the paragraph delimiter that should be applied for a given character or piece of text in the document by referring to the piece table. Based upon the file number found for the PCD that relates to the given piece of text, the word processing system determines the appropriate pointer to the FCB in which the paragraph delimiter that was used is indicated. Details of the step implemented in block 46 are shown in FIG. 7.

First, in a block 100, the word processing system determines the piece containing the given character to be displayed and the corresponding PCD in the array of data records. A block 102 provides for determining the file number and range of file positions for each piece that is to be displayed and for determining the pointers to the FCB for the text that is referenced by the coordinates of the piece in the piece table.

For a given character position in the document, the word processing system searches the piece table for the document to locate the piece that contains the character at the given character position. Using the PCD contained in the array of data records for that piece, the word processing system determines the range of file positions containing all of the characters of the piece. In addition, the file position in the file that corresponds to the character position is determined. This character position is represented by the variable cp. Similarly, cpPiece is a variable that represents the character position in the document for the beginning of the piece in which cp is found. The value of cpPiece is determined by searching the piece table for the largest character position that is less than or equal to cp. The variable pcdPiece is the PCD entry in the array of data records of the piece table that corresponds to cpPiece. The word processing system can then determine fc, the file coordinate of cp from the equation:

$$fc = pcdPiece.fc + (cp - cpPiece) \qquad (1)$$

The file number of the piece that contains the character cp is represented by the variable pcdPiece.fn.

A block 103 in the flow chart indicates that the next step in the method is to determine the beginning and limit character positions for the paragraph that contains the given text or character. In order to find the beginning character position of a paragraph that contains the character cp, the word processing system first searches in the piece table to find the character position of the beginning of the piece that contains the character, i.e., cpPiece, and then fetches the corresponding PCD for that piece from the array of data records. The corresponding PCD is referred to as the pcdPiece. The word processing system determines the file coordinate fc for the character using Equation 1. With the file coordinate fc, the word processing system is able to use the pcd.fn to find a table of paragraph file coordinates maintained for each binary file. The word processing system can search within this table to find the largest file coordinate that is less than or equal to the fc of the character in the paragraph. If the file coordinate found is greater than pcdPiece.fc, the file coordinate for the beginning of the paragraph is the file coordinate that was fetched from the table of paragraph file coordinates. Conversely, if the file coordinate that was found is less than pcdPiece.fc, then the beginning paragraph coordinate position is not within the current piece, but must reside in an earlier piece. In this case, it will be necessary to search toward the beginning of the piece table until a file coordinate range is found for a piece containing an fc recorded in the paragraph coordinate table of the document.

To find the limit position, cpLim, for the paragraph that contains the character at coordinate cp, the word processing system again finds the character position of the beginning of the piece containing the coordinate cp in the piece table, i.e., cpPiece, and then fetches the corresponding PCD from the piece table, pcdPiece. The word processing system again determines the file coordinate fc for the character using Equation 1, and looks up the next cp entry in the piece table, setting cpLim to its value. The system determines the limit fc of the piece containing the file coordinate for the character in the paragraph, which is referred to by the variable fcMac, using the following equation:

$$fcMac = pcd.fc + (cpLim - cpPiece) \qquad (2)$$

The word processing system carries out a look up in the file coordinate table referenced by pcd.fn in order to determine the largest fc that is less than or equal to the file coordinate of the character in the paragraph. The next fc in the file coordinate table, referred to as fcLim, is fetched. If fcLim is less than or equal to fcMac, the word processing system has identified the file location of the end of paragraph delimiter for the paragraph that contains the character in question. This file location is referred to as fcParaLim. The word processing system then determines the character position coordinate for the limit character position of the paragraph, cpLimPara, as follows:

$$cpLimPara = cpPiece + (fcParaLim - pcd.fc) \qquad (3)$$

If fcLim is greater than fcMac, the piece does not contain an end of paragraph delimiter. In that instance, the word processing system searches toward the end of the piece table until an fc range is found that corresponds to a piece containing an fc recorded in the paragraph file coordinate table of the file.

The fcMac calculated for the last PCD fetched, which corresponds to the end of paragraph delimiter for the paragraph containing the character, determines the type of paragraph delimiter in use. In order to report the size and type of paragraph delimiter, the word processing system uses the pcd.fn from the last fetched PCD to access the FCB that describes the file containing the paragraph mark so that it can determine the values for the two paragraph delimiter bit fields fl3Term and fCrLf. The values returned for these two bits from the pcd.fn are copied respectively to global flags, vfl3Term and vfCrLf. After the paragraph bounds have been determined by the word processing system, if vfCrLf is true, the word processing system knows that the paragraph whose bounds have been found ends with the paragraph delimiter two-byte sequence 13 10. If the vfl3Term is true on completion of the routine, the word processing system knows that the paragraph ends with the paragraph delimiter 13. Similarly, if neither of the global flags are true, the word processing system knows that the paragraph ends with the delimiter 10.

A decision block 104 determines if the fl3Term bit field in the FCB is equal to a binary 1 (true). If not, the word processing system knows that the paragraph delimiter for the piece in which the text is found equals 10. Alternatively, if the result of the inquiry in decision block 104 is positive, a decision block 110 checks to determine if the fCrLf flag has been set in the FCB. If so, as indicated in a block 112, the word processing system identifies the paragraph delimiter used as the sequence 10 13. Otherwise, the paragraph delimiter must be equal to the single character 13, as indicated in a block 114. Thereafter, the logic returns to FIG. 3, as indicated by a block 108 in FIG. 7.

Displaying Text

The word processing system includes a routine for displaying text that has been entered into a document. Under this routine, the word processing system begins scanning the characters of the document at a particular character position in the piece table, copying the characters one at a time into a line description buffer. The line description buffer records the characters that are to be displayed on one line of the display screen. This scanning and copying routine is repeated until there is no further space available on the line to display another character, or until a character is encountered that terminates the line. In the preferred embodiment of the word processing system, there is also provision for displaying a predetermined different character when a specific character is encountered, by writing the different character to the line description buffer instead of the specific character. For example, in WinWord 6, a special graphics symbol "¶" is optionally displayed to denote the end of a paragraph. When building the line description buffer a character at a time, the word processing system determines the paragraph bounds for the character position at the beginning of a line, initially checking the global terms vfl3Term and vfcrLf, before beginning the layout of the rest of the line in the buffer. If a 13 character is encountered and the global flag vfCrLf is set to true, the word processing system knows that a character 10 follows the 13 and that the two bytes together terminate the current paragraph and the current line. Further, the word processing system writes a special byte code to the line description buffer that causes the end of paragraph graphic symbol to be used (if that option is elected by the user), terminates the line being laid out, and sets variables so that no character will be displayed to represent the 10 used in the two-byte paragraph delimiter. If the word processing system encounters a 13 paragraph delimiter and the lower case vf13Term flag is set, the word processing system knows that a single 13 paragraph delimiter has been encountered and that the special end of paragraph graphic character should be substituted for this single delimiter. Finally, if a character 13 is encountered while the vf13Term flag is false, the word processing system knows that the character 13 is not an end of paragraph delimiter and should be displayed as a single character within the line buffer. In an analogous manner, a character 10 encountered while the vf13Term flag is set to false causes the word processing system to recognize that the character 10 is an end of paragraph delimiter, while if the flag is set to true, the character 10 is retained and copied to the line layout buffer, so that it can be displayed. Using this technique, as indicated in a block 48, the word processing system displays text built up in the line display buffer, by applying the native paragraph delimiter to replace any non-native paragraph delimiter that is found and optionally using the special end of paragraph graphic symbol to indicate the end of a paragraph, regardless of the type of paragraph delimiter found.

Saving a Document

The method employed by the preferred embodiment of the word processing system requires that a particular paragraph delimiter format be used uniformly throughout a file. Thus, when a document that includes pieces pasted from files using different paragraph delimiters is saved to a file, all of the text that is written to the file must use the native paragraph delimiter, which for WinWord 6 is the single character 13. The text of pieces that do not point at the file currently being saved are copied to that file so that when the operation is complete, the PCDs of affected piece table entries are rewritten to point to the saved file and the file position within the file where the text for the pieces is recorded. Further, if a new file is created to store the contents of a document, the text of the pieces are written in character position order into the file so that when the save is complete, the piece table for the new file can be written to include only a single piece that describes all of the text in the new file.

To save a document that includes text pasted from one or more files, special processing must be done to ensure that paragraph delimiters comprising the single 10 character or the 13 10 two-byte sequence are replaced with a single 13 byte code. If the 13 10 sequence is encountered, only the first byte of the sequence needs to be written to the file that is being saved, and the 10 portion of the two-byte sequence can be deleted or dropped.

In the preferred embodiment, the word processing system saves a document using a routine called FetchCp that is passed a document number and a particular character position within a file. The routine fetches text from files into memory and returns a character pointer to one or more character of text in the document. The beginning of the text pointed to by the pointer corresponds to the character position passed to the routine. The FetchCp routine also reports the number of adjacent characters that were fetched from the document.

When a document is saved by the word processing system, the FetchCp routine is called repeatedly. The character position from which the text will be fetched is incremented by the amount of text retrieved the last time that the routine was called. By thus incrementing the character position that is passed to the routine in this manner, all of the text in a document can be fetched more efficiently. If a piece of text contains only paragraphs that are represented by the single 13 character, which is the native paragraph delimiter, the routine can bring as much of the text referenced by a piece as possible into memory without paying attention to paragraph bounds within the fetched text. However, if the text referenced by a piece contains the character 10 or the two-byte sequence 13 10 used as a paragraph delimiter, the FetchCp routine reports the non-native paragraph delimiter to be at the beginning of a buffer into which the text is loaded by the routine before being written to the file. For example, if 15 bytes are retrieved from a file in which the 14th and 15th byte coordinates store a 13 10 sequence as the paragraph delimiter, the FetchCp routine reports that only 13 bytes were retrieved, thereby insuring that the next time the FetchCp routine is implemented, it will return the 13 10 sequence at the beginning of the buffer passed by the routine. It is also important that the FetchCp routine report the single character 10 paragraph delimiter or the two-byte sequence 13 10 paragraph delimiter as the only characters returned by the routine if the character position passed into the FetchCp routine is the beginning position of one of these paragraph delimiters. This requirement ensures that, if the character fetched is a single 10 character, the FetchCp routine will instead point at a character 13, which is stored in a global variable, as a substitute for the character 10 that is actually fetched.

Figure 8:
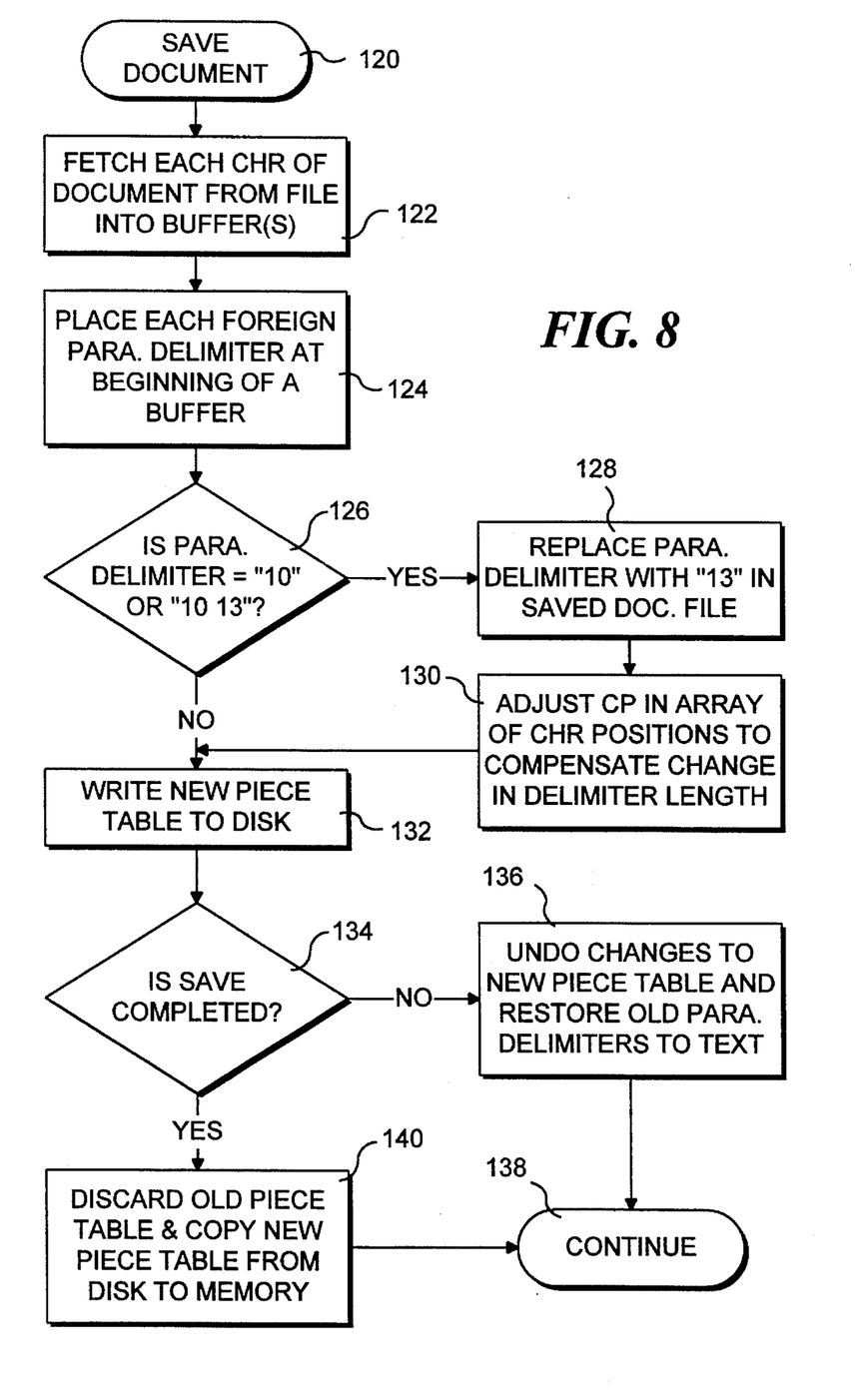
FIG. 8 is a flow chart illustrating the logical steps employed in saving a document that includes pasted text, which uses foreign paragraph delimiters.

Details of the steps implemented in response to a decision block 50 in FIG. 3, which determines if a document is being saved by the user, are shown in FIG. 8. Specifically, in a block 122, each character of the document is fetched from the file in which it is stored, into one or more temporary buffers. As noted above, each foreign paragraph delimiter fetched by the FetchCp routine is placed at the beginning of a buffer. A decision block 126 determines if any paragraph delimiter encounter is the character 10 or the two-byte sequence 10 13, and if so, a block 128 provides for replacing the foreign paragraph delimiter with the character 13 in the saved document file.

If the FetchCp routine reports that the two-byte sequence 13 10 has been fetched and temporarily stored in a buffer (having length two), a flag is set that will be tested when the buffer is saved to file. The flag indicates that the buffer currently holds the paragraph delimiter two-byte sequence 13 10. The save code transmits the first byte of the two-byte sequence to the file in which the document is being saved to represent the required paragraph mark, but blocks transmission of the character 10 to the file, as indicated in a block 128 in the flow chart of FIG. 8.

Anytime that the paragraph delimiter two-byte sequence 13 10 is thus transformed into the paragraph delimiter character 13 during the save of the document to a new file, the transformation invalidates the then current piece table for the document and any other table of character positions (such as the table maintained for footnotes), which is kept by the word processing system. Any entries in these table of character positions at coordinate positions greater than that of the current 13 10 paragraph delimiter must be reduced by one, since the two-byte sequence of the paragraph delimiter has been replaced by a single character 13 paragraph delimiter.

The updating of character position tables is performed after the last time that any of these tables is accessed during the save operation, but before the tables are written to a file stored on hard drive 16. For all of the character position tables except the current piece table, the word processing system scans the document by repeatedly calling the FetchCp routine for each character within the document text stream, immediately before these tables are written. When the FetchCp routine reports that it has returned a pointer to a 13 10 paragraph delimiter that was fetched from a file, the word processing system adjusts all character position coordinates in the character position array of the tables that are greater than the current character position of the paragraph delimiter, by reducing them by one position.

Producing a piece table to describe the location of the pieces within a newly saved file must be done with care, because the FetchCp routine that reports the positions of each paragraph delimiter depends upon the PCD entries in the array of data records that point to the original pieces of text and upon the character position coordinates recorded in the original piece table for pieces that include any paragraph delimiter two-byte sequences 13 10. Although it might be possible to create a transformed piece table in the memory allocation of the word processor and then replace the old piece table with the new during the save procedure for a document, this solution is not optimal and could fail at times. For example, insufficient memory may be available in the personal computer system to hold a copy of even a small piece table. Frequently, when a save operation is executed, there is not even sufficient memory available to create a very small data structure.

If the text of the document to be saved is being saved to an entirely new file so that the text referenced by the pieces can be written to the file in character position order, the original piece table can simply be discarded and a new one built that covers the extent of all of the characters of the text. The save procedure can save the file coordinates where it began to write text, and the memory processing system will know the number of characters transmitted to the file. Accordingly, the piece table can be created with an array of character positions containing only two slots. The zero slot simply contains the character position zero, and the first entry records the number of characters stored in the file. Thus, the piece table holds a single PCD entry having a pcdfc that records the file position only at the beginning of the text.

However, when the piece table must be maintained after the save, because some of the text is recorded in noncontiguous file coordinates, the save process records a new version of the piece table on hard drive 16. In the new version of the piece table, character position coordinates are altered to reflect changes to any translated two-byte sequence 13 10 paragraph delimiters, and the pcd.fc values are changed to point to the locations of the text referenced by the pieces in the newly saved file. Since the save procedure does not alter the original piece table, the FetchCp routine can be called iteratively to check the text in the original text file and report the character positions of any two-byte sequence 13 10 paragraph delimiters encountered. Then, as was done previously for other character position tables, the save procedure transforms any character positions larger than the location of the paragraph delimiter by subtracting one from the coordinates for those character positions. It then writes the transformed entries to the hard drive for the new file. Once the save procedure is completed, the entire original piece table for the document that was previously used is discarded, and the newly saved piece table is copied from hard drive 16 into an allocated memory block. Thereafter, any calls to the word processing system to fetch text will retrieve characters from the newly saved file rather than checking the original piece table for references to the original files from which the pasted text was derived.

A block 132 in FIG. 8 provides for writing this new piece table to hard drive 16. Next, a decision block 134 determines if the save procedure has been completed. If not, a block 136 provides for undoing the changes to the new piece table and for restoring the old paragraph delimiters to the text. Thus, if a save process is terminated before complete, for example, because there is insufficient space on the hard drive to save a new copy of the document, the word processing system will undo the changes performed to any of the document character position tables. In order to properly fix these tables, the word processing system must know how many paragraph adjustments have been performed up to the point at which the save operation was interrupted. This information is maintained by the word processing system to cover such contingency. To recover from an interrupted save operation, the word processing system executes a process that repeatedly calls the FetchCp routine, but in this case, adds one to each entry in the piece table having a character position that is larger than the file position of the paragraph delimiter for each of the 13 10 sequences used for a paragraph delimiter in the original text. This process is repeated until the same number of character position adjustments have been made, in which one is added to each character position coordinate, as were done previously to adjust entries by subtracting one from each coordinate. When the process is completed, all of the original character positions in the piece table are restored to their original values for all characters in the document. The logic then proceeds to a block 52 in which the flow chart ends.

In the event that the document is not saved, the original piece table is maintained, with references to each of the source files from which text using foreign paragraph delimiters is stored. In this case, termination of the word processing system execution on computer system 10 results in the logic proceeding to block 52.

Because text pasted into a document need not be scanned in its entirety prior to display and editing of the text, the present method and word processing system employing it are able to open a file so that text from a file can be immediately displayed when that file is opened. It is only when the document in which the text is pasted is finally saved that the translation of the paragraph delimiters into the native paragraph delimiter form is carried out in the file to which the document is saved. As a result, this word processing system and the method it employs is very efficient in handling imported text that uses foreign paragraph delimiters.

Although the present invention has been described in connection with its preferred form of practicing the invention, those of ordinary skill in the art will understand that many modifications can be made thereto within the scope of the claims that follow. Accordingly, it is not intended that the scope of the invention in any way be limited by the above description, but that the scope be determined entirely by reference to the claims that follow.

The invention in which an exclusive right is claimed is defined by the following:

1. A method for properly displaying paragraphs of text that use a foreign paragraph delimiter, the foreign paragraph delimiter being different than a native paragraph delimiter of documents created on a word processing system, said method comprising the steps of:

(a) producing a character position array in which each character of a document that is open on the word processing system is assigned a position, said character position array being divided into a plurality of pieces, each piece comprising a string of characters that are stored adjacent to one another in a file and which have identical format properties;

(b) producing an array of data records including entries that correspond to each piece of the character position array, each entry including a file number and a file position within a file at which the string of characters comprising the piece are stored;

(c) producing a file control block for each file storing text used in the document when the file is initially opened by the word processing system;

(d) inserting delimiter identification data in the file control block of each file, said delimiter identification data indicating a type of paragraph delimiter used by the text stored in the file;

(e) each time that a character of the document is displayed, referring to the character position array and to the array of data records to determine a specific file in which the character is stored, the delimiter identification data in the file control block for said specific file indicating the type of paragraph delimiter that is used for a paragraph containing the character; and (f) if the paragraph containing the character uses a foreign paragraph delimiter, translating the foreign paragraph delimiter to the native paragraph delimiter in a display buffer, so that the paragraph containing the character is properly displayed to the user.

2. The method of claim 1, wherein all foreign paragraph delimiters used for text in the document are translated to the native paragraph delimiters when the document is saved to a file.

3. The method of claim 1, further comprising the step of checking for a header or a trailer to the text in a file opened by the word processing system, said header or trailer at times indicating the type of paragraph delimiter used by the text so that corresponding delimiter identification data are provided in the file control block for said file.

4. The method of claim 1, further comprising the steps of scanning at least a portion of the text in a text file opened by the word processing system to identify a specific type of paragraph delimiter that is used in said portion of the text, and specifying the delimiter identification data corresponding to said specific type of paragraph delimiter in the file control block for said text file.

5. The method of claim 4, wherein occurrences of each of a plurality of different types of paragraph delimiters are counted to identify which type of paragraph delimiter occurs most often, the type of paragraph delimiter that occurs most often thus being determinative of the delimiter identification data specified for the file control block of said text file.

6. The method of claim 1, further comprising the step of maintaining a table of limit file positions within each file, said limit file position reporting a position within the file of each paragraph delimiter used within the text so that the paragraph delimiter used at that position can be identified.

7. The method of claim 1, further comprising the steps of determining a beginning paragraph file position for a paragraph in which a specific character of text is found; determining a limit character position of said paragraph; and reporting the size and type of the paragraph delimiter found at the end of said paragraph to determine the delimiter identification data that is inserted into the file control block for the file.

8. The method of claim 1, further comprising the steps of using the delimiter identification data to identify any two-byte paragraph delimiter sequence that is used in the text; and precluding an insertion point from being selected between the two-bytes comprising said two-byte paragraph delimiter sequence, during editing of the text.

9. The method of claim 1, further comprising the steps of displaying a special character that indicates an end of the paragraph for any of the plurality of different types of paragraph delimiters used for the text being displayed; and not displaying foreign paragraph delimiters.

10. The method of claim 1, further comprising the steps of:

(a) translating any foreign paragraph delimiters to the native paragraph delimiter in the document when it is saved;

(b) producing a new character position array that includes pieces without any foreign paragraph delimiters; and (c) producing a new array of data records including entries that correspond to each piece of the new character position array, each entry including a file number for the file in which the document is saved and a file position within said file.

11. The method of claim 10, wherein after the document is saved, any calls by the word processing system to retrieve text are directed to the file in which the document was saved.

12. The method of claim 10, wherein if the step of saving the document is interrupted before it completes, the character position array and the array of data records originally produced are again referenced to ensure that all of the character positions in the document are restored to their original values, including any references to the foreign paragraph delimiters used for text.

13. A method for enabling a word processing system to properly identify and display paragraphs in a document that includes pasted text, said pasted text using a different type of paragraph delimiter than that used by the word processing system, comprising the steps of:

(a) assigning each character in the document a coordinate in a piece table, said piece table comprising a character position array and an array of data records, said character position array including a plurality of pieces, each piece comprising at least one character, all characters in each piece having common formatting properties and being stored in a contiguous string within a common file, said array of data records including a separate record corresponding to one of the pieces in the array of character positions;

(b) in each record of the array of data records, including a pointer to a file control block for the file in which all of the characters of the text in the piece are stored;

(c) providing delimiter data bits in each of the file control blocks that indicate the type of paragraph delimiter used for the text stored in each file;

(d) when a character of the document is selected by a user for display, determining a specific file control block for the file in which the character is stored, based upon the position of the character in the piece table;

(e) identifying the paragraph delimiter that was used in the text, as a function of the delimiter data bits in the specific file control block determined in step (c); and (f) properly displaying the paragraph in which the character selected by the user is contained by translating any paragraph delimiters in the text displayed to the type of paragraph delimiter used by the word processing system.

14. The method of claim 13, wherein the delimiter data bits include a bit indicating whether the paragraph delimiter includes a carriage return character and a bit indicating whether the paragraph delimiter includes two characters instead of one character.

15. The method of claim 13, further comprising the step of setting the delimiter data bits in the file control block of an accessed file when said accessed file is opened to paste text in the accessed file into the document.

16. The method of claim 15, wherein said accessed file that is opened is a word processing file that includes data stored in it indicating the type of paragraph delimiter used for the text in said word processing file.

17. The method of claim 15, wherein said accessed file is a text file, further comprising the step of checking each of the characters in at least a portion of the text file to determine which type of paragraph delimiter has been used within the text file.

18. The method of claim 17, wherein the step of determining the type of paragraph delimiter that was used includes the steps of separately counting each of the types of paragraph delimiters found in the portion of the text file that was checked, and identifying the type of paragraph delimiter that was used in the text file as the type occurring most often in said portion.

19. The method of claim 13, further comprising the steps of determining bounds of a paragraph containing a character to be displayed; and having identified an end of the paragraph, determining the number of characters in the paragraph delimiter used for said paragraph.

20. The method of claim 19, wherein the step of determining the bounds of the paragraph comprise the step of referring to a paragraph file position table in the file used to store the characters in one of the pieces, said paragraph file position table reporting a limit file position for each paragraph delimiter used in the text stored in said file.

21. The method of claim 13, further comprising steps of loading a display buffer with text to be displayed; and if said text uses a type of paragraph delimiter that is different than the paragraph delimiter used by the word processing system, translating the type of paragraph delimiter used with said text into the type of paragraph delimiter used by the word processing system within the display buffer so that any paragraphs within said text are displayed as originally created.

22. The method of claim 13, further comprising the steps of converting the different paragraph delimiters into the type of paragraph delimiter used by the word processing system, at the time the document is saved to a file; and creating a new piece table.

23. The method of claim 22, wherein if an interruption occurs while the document is being saved, the piece table in use before saving the document was initiated is used to restore all characters in the document to their original pieces so that the paragraph delimiters used for each piece are again referenced by the file control blocks for the files in which the text of the pieces is stored.

24. The method of claim 13, further comprising the step of preventing insertion of text between two characters comprising one of the types of paragraph delimiters in the text pasted into the document.

25. A word processing system in which paragraphs of text that use a foreign paragraph delimiter are properly displayed, the foreign paragraph delimiter being different than a native paragraph delimiter of documents created on the word processing system, comprising:

(a) a computer that includes a memory in which is stored a set of executable instructions, a non-volatile memory for storing data files and program files, a user interface for entering text and selecting control options, and a display for visually presenting text and control options to a user, said executable instructions causing the computer to operate as a word processor;

(b) means for producing a character position array in which each character of a document that is open on the word processing system is assigned a position, said character position array being divided into a plurality of pieces, each piece comprising a string of characters that are stored adjacent to one another in a file and which have identical format properties;

(c) producing an array of data records including entries that correspond to each piece of the character position array, each entry including a file number and a file position within a file at which the string of characters comprising the piece are stored;

(d) means for producing a file control block for each file that stores text used in the document when the file is initially opened by the word processing system;

(e) means for inserting delimiter identification data in the file control block of each file, said delimiter identification data indicating a type of paragraph delimiter used by the text stored in the file;

(f) means for determining a specific file in which a character of the document that is displayed is stored by referring to the character position array and to the array of data records, the delimiter identification data in the file control block for said specific file indicating the type of paragraph delimiter that is used for a paragraph containing the character; and (g) means for translating any foreign paragraph delimiter to the native paragraph delimiter in a display buffer in the memory, so that the paragraph containing the character is properly displayed to the user on the display screen.

26. The word processing system of claim 25, further comprising means for translating foreign paragraph delimiters used for text in the document to the native paragraph delimiters when the document is saved to a file.

27. The word processing system of claim 25, further comprising means for checking for a header or a trailer to the text in a file opened by the word processing system, said header or trailer at times indicating the type of paragraph delimiter used by the text so that corresponding delimiter identification data are provided in the file control block for said file.

28. The word processing system of claim 25, further comprising means for scanning at least a portion of the text in a text file opened by the word processing system to identify a specific type of paragraph delimiter that is used in said portion of the text, and means for specifying the delimiter identification data corresponding to said specific type of paragraph delimiter in the file control block for said text file.

29. The word processing system of claim 25, further comprising means for counting occurrences of each of a plurality of different types of paragraph delimiters to identify a type of paragraph delimiter that occurs most often, the type of paragraph delimiter that occurs most often thus being determinative of the delimiter identification data specified for the file control block of said text file.

\* \* \* \* \*